Dec. 21, 1954     M. D. GLASS     2,697,566
SELECTIVE TWO OR THREE CONTROL TYPE SYSTEM FOR AIRCRAFT
Filed Oct. 11, 1949     2 Sheets-Sheet 1
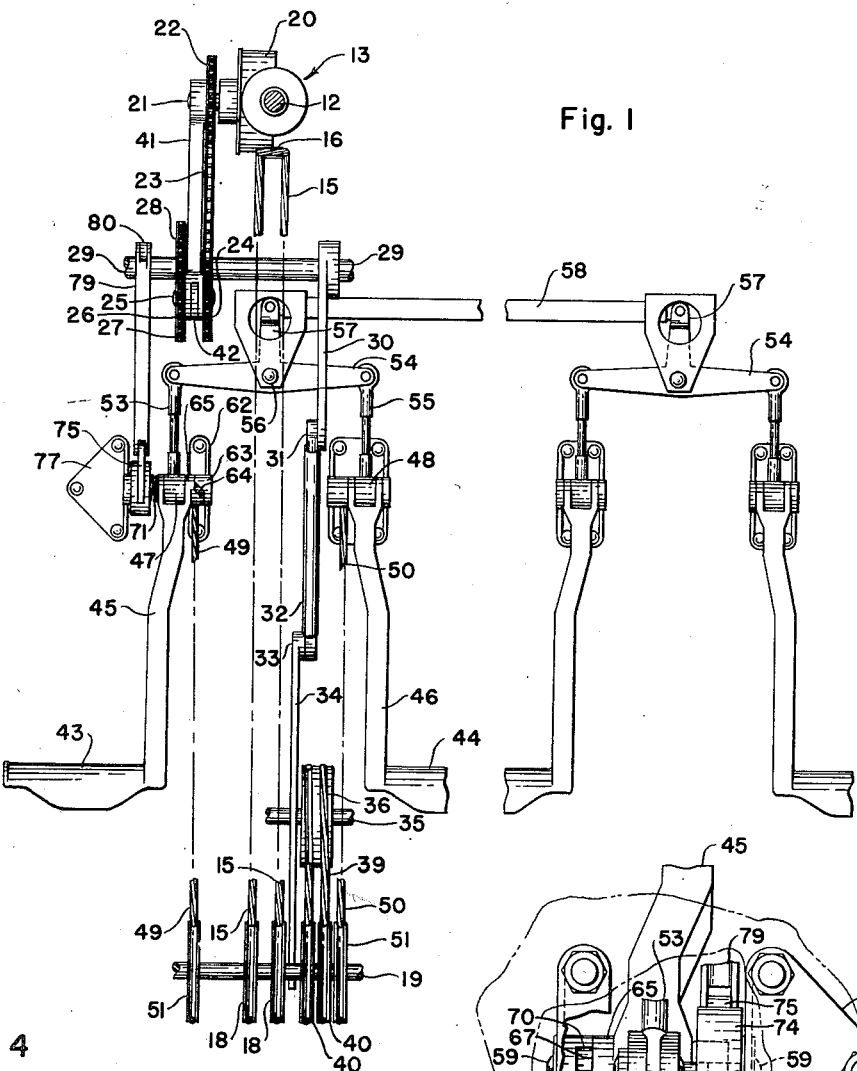
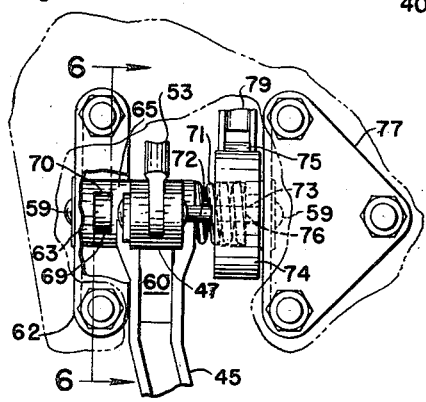
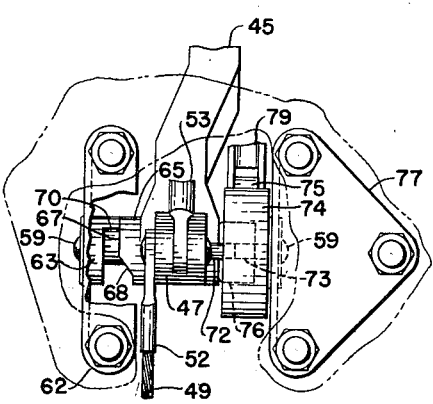
Mansfield D. Glass
*INVENTOR.*
HIS PATENT AGENT.

Dec. 21, 1954      M. D. GLASS      2,697,566
SELECTIVE TWO OR THREE CONTROL TYPE SYSTEM FOR AIRCRAFT
Filed Oct. 11, 1949      2 Sheets-Sheet 2
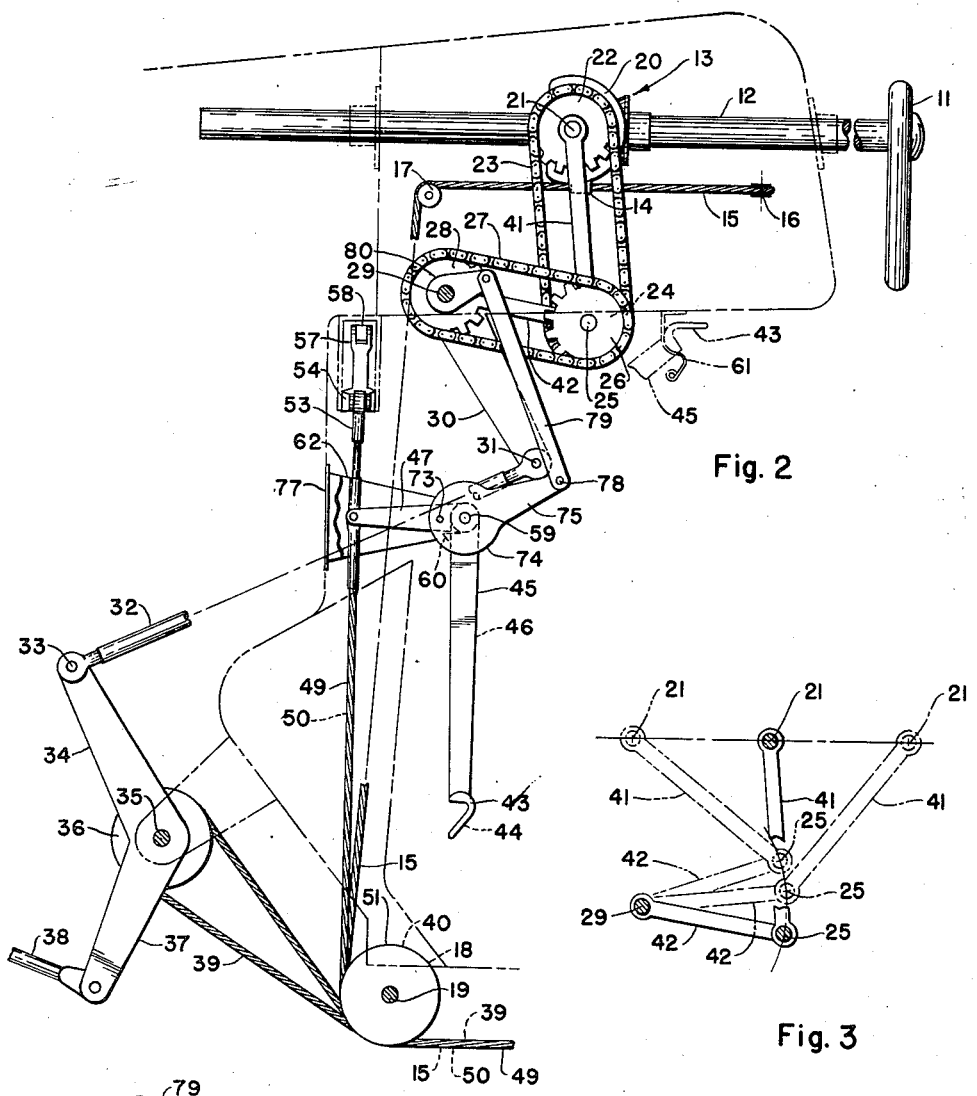
Mansfield D. Glass
*INVENTOR.*
BY
HIS PATENT AGENT.

United States Patent Office 2,697,566
Patented Dec. 21, 1954

2,697,566

SELECTIVE TWO OR THREE CONTROL TYPE SYSTEM FOR AIRCRAFT

Mansfield D. Glass, Wichita, Kans., assignor to Boeing Airplane Company, Wichita, Kans., a corporation of Delaware Application October 11, 1949, Serial No. 120,650

7 Claims. (Cl. 244—83)

This invention relates to a pilot operated system for actuating the flight controls of an aircraft and more particularly to the improvement in such a system whereby it is adapted for ready conversion from the more commonly known three-control type system to a two-control type or vice versa at the will of the operator.

In the operating controls for aircraft it is the more commonly known practice to have a so-called three control type system in which the rudder is actuated by a pair of rudder pedals while the elevators are actuated by a joy stick or control column as the result of fore and aft movement of the stick. At the same time the ailerons can be actuated from the same instrumentality by motion in a different sense from that causing elevator action. For instance, in the case of a joy stick control, lateral movement to one side or the other from neutral would cause actuation of the elevators or in the case of a control column terminating in a handwheel, rotation of this wheel about its axis would cause such aileron action. On the other hand there is also the two control system in which two of the three flight control surfaces are interconnected for conjoint operation. Most usually the rudders and ailerons are so interlinked to the end that whenever actuation of the rudder is made to accomplish a change of control in yaw, an accompanying operation of the ailerons will occur to introduce a correct degree of roll during the turn. With such two-control type mechanisms, the foot actuated rudder pedals are eliminated completely and all flight control is accomplished by the pilot through a suitable hand control.

Obviously the two types of control systems are accompanied by certain advantages and disadvantages and as the result certain pilots prefer the first while still others prefer the second. Under these circumstances it is of course desirable to have a flight control system that can readily be converted from one type to the other so that the preferences of the particular pilot operating the plane can be met instantaneously and as soon as the same or a different pilot desires a further change, that should also be readily accomplished.

Although as indicated heretofore, individual preferences of the pilot may dictate which type of control would be used under different circumstances, it is believed that as a general rule the three-control hook-up would be preferred during take-off and landing phases of flight operation since the three-control arrangement gives a more precise and versatile pilot control over the airplane during the more critical period when the airplane is approaching or leaving the ground. For example, side slipping is often found to be a necessary manoeuver during the landing approach and this can only be accomplished by the pilot through operation of the flight controls under the three-control hook-up.

On the other hand, most pilots much prefer to use a two-control system during cruising flight because it is much less tiresome to operate to accomplish the usual in-flight course corrections or other manoeuvers. This is due to the fact that the two control system eliminates the continuous use of both hands and feet to control the airplane, and relieves some of the mental concentration on the part of the pilot to accomplish proper coordination of the separate controls. As the result, flying is possible using only the hands alone or the feet alone, depending upon the particular control hook-up that is present.

In prior practice, as has been indicated, both two- and three-control types of flight control systems have been employed but once the initial selection of type had been made the pilot had to operate within the limitations of whatever type of system had been installed in the airplane and it was not possible to readily switch from one type of system to the other as desired.

Accordingly, it is the principal object of this invention to provide a convertible flight control mechanism that can readily be converted by the pilot to permit either two- or three-control type of operation.

It is a further object to provide a control system that has the important advantage of contributing to pilot comfort and reduction of fatigue through allowing a choice of a simpler and more easily operated type of control system for use under cruising conditions. It is also an object to provide a mechanism of this character that shall be simple in its organization for performing the functions intended but at the same time shall function positively regardless of the selected adjustment. It is a further object to provide for conversion of the system by operation of one or more of the elements normally contained in a flight control system so as to hold to a minimum the number of parts required in the mechanism and to arrange the conversion element so that it will indicate by its relative positioning, whether the control mechanism is set to give two- or three-control operation.

These and other objects and advantages of this invention will become apparent from consideration of the following description taken in connection with the appended drawings, wherein for purposes of illustration, I have shown a preferred embodiment of my invention.

In these drawings:

Fig. 1 is an end elevation of the pilot actuated portion of a control mechanism according to the present invention;

Fig. 2 is a side elevation of the mechanism appearing in Fig. 1;

Fig. 3 shows a sequence operation of certain links as they appear in Fig. 2;

Fig. 4 is an enlarged detail, looking rearwardly, of the most leftward rudder pedal hanger connection of Fig. 1;

Fig. 5 is a view corresponding to that of Fig. 4 with the rudder pedal hanger in raised position; and Fig. 6 is a further showing in side elevation of the joint connection of Figs. 4 and 5.

Referring more specifically to the details of the illustrative embodiment of the invention as shown in the drawings, the system selected for this purpose includes a handwheel control for elevator and aileron actuation, foot pedals for rudder actuation and the special releasable interconnection between the handwheel and foot pedal mechanisms so that conversion of the system for two control operation can be effected. These elements of the system are depicted in their relative organization in the more general showings of Figures 1 and 2 wherein a more or less conventional handwheel is designated 11, being carried at the end of a tube or shaft 12 which extends generally horizontally through the dashboard of the vehicle in which it is mounted through conventional supports which both allow sliding movement in the direction of the longitudinal axis of the shaft therethrough and rotational movement about the said axis. This type of mounting is generally known in the art and advantage is taken of the fact that the two types of motion can be obtained either singly or conjointly to permit operation of the ailerons as the result of the rotational movement while actuation of the elevators is obtained through the fore and aft sliding movement.

More particularly, as appears in Fig. 2, the shaft 12 carries a gear box and connection element 13 attached thereto which acts as a take-off to impart the respective shaft motions to the elevator and aileron mechanism. In the first instance, the element 13 has a lug 14 to which the elevator operating cable 15 is positively attached. As viewed in Fig. 2, the cable 15 attaches to the lug 14 and continues rearwardly to a pulley 16 which reverses its direction so that a portion of the cable extends forwardly parallel to and in the same plane as the first portion. These portions run over forwardly located pulleys 17 constituting a spaced pair which serve to change the direction of the cable runs downwardly to pulleys 18 mounted loosely on a cross-shaft 19. From these pulleys the cable runs 15 extend rearwardly under the flooring to the elevator operating horns as is conventional. By this hook-up, as the handwheel is drawn rearwardly, for instance, the cable 15 is shifted in the appropriate direction over the aforementioned pulleys and the elevators are appropriately actuated in known fashion.

For obtaining aileron movement, the element 13 has a gear box portion 20 containing a conventional right angle bevel gear drive (not shown) which responds to rotational movement of the handwheel shaft 12 and imparts the same to a stub shaft 21 which has affixed thereto a toothed wheel 22. Running over this wheel 22 is an endless chain 23 which imparts motion to a similar wheel 24 affixed to a second stub shaft 25. A third cog wheel 26 of the same type is fixed to this shaft and an endless chain 27 is run thereover, also encircling a fourth cog wheel 28 fixed to a cross-shaft 29.

Also fixed to the aforesaid shaft 29 is a crank 30 which at its otherwise free end pivotally connects as at 31 to a push-pull link 32 which at its other end pivotally connects as at 33 to a bell crank 34. This crank is mounted on a shaft 35 and its other arm may connect as at 37 to a push-pull rod 38 leading to a nose wheel steering mechanism, not forming a part of this invention. At any rate the shaft 35 has a cable drum 36 affixed thereon which operatively is associated with aileron operating cable 39, the two runs of which extend rearwardly under guide pulleys 40. These pulleys like pulleys 18 operate loosely on shaft 19 and the cable 39 rearwardly thereof, connects to the remainder of the aileron operating system which may be of any desired form. In following through the sequence of the mechanism just described it will be apparent that any rotation of the handwheel will cause a corresponding displacement of the cable 39 by action of the drum 36 paying out one run of the cable and drawing in on the other.

In order to complete the description of the aileron operating mechanism, it is necessary to explain the special provision for mounting the intermediate cog wheels 24 and 26 which is necessitated by the fact that the first cog wheel 22 partakes of any fore and aft movement of the shaft 12 and attached handwheel 11 as they are shifted to cause elevator actuation. In fact were it not for the shift in position to which the cog wheel 22 is subjected from time to time, the intermediate cog wheels 24 and 26 as well as shaft 25 and chain 27 could be eliminated and the endless chain 23 could then be run directly to cog wheel 28. However, since these components are essentially included, a floating type of support is provided for the stub shaft 25 and this is further illustrated in Fig. 3 where it may be seen that the support is provided by a pair of links 41 and 42. The link 41 pivotally hangs from the shaft 21 and its lower end is bifurcated as appears in Fig. 2 to receive the one end of the link 42, both link ends being apertured to receive the stub shaft 25 which in turn supports the cog wheels 24 and 26. Likewise the link 42 is pivotally connected to the shaft 29 at its other end. As may be seen in Fig. 3, the shaft 21 is subject to movement back and forth along a straight line which necessitates movement of the shaft 25 and this occurs along the arc of a circle centered on the axis of shaft 29. In this way the sliding movement of the shaft 21 can be accommodated without causing any adverse effect on the operating relationship of the endless chains 23 and 27 and their associated cog wheels.

The rudder operating mechanism for use when the system is operated as a three-control type, includes paired right and left hand rudder pedals 43 and 44 which are hung from pivotal supports by hangers respectively designated 45 and 46. As indicated in Fig. 1, the rudder pedal installation can be provided in duplicate for dual control as is customary in many installations and this of course applies also to the handwheel 11.

The rudder pedal hangers are supported in each case by brackets holding stub shafts. In addition the hangers engage respective lever arms 47 and 48 which extend forwardly to connect to the rudder operating cables 49 and 50 which extend downwardly to pulleys 51 on shaft 19. The connection of the cables to the levers is best shown in Fig. 5 where the cable 49 terminates in a suitable end fitting 52 which is pinned to the otherwise free end of the lever 47. An equalization connection is provided between the rudder pedals of the pair. This consists of a pivotally connected link 53 running upward to one arm of a rocking bar 54. The opposite end of this bar is pivotally connected to a similar rigid link 55 which extends to connection with the end of lever 48. The rocking bar 54 itself is pivotally mounted at its midpoint by a pin 56 supported in fixed structure. This bar also has a third arm 57 which at its end pivotally connects to a tie bar 58 which at its other end connects to the corresponding arm 57 of a second rocking bar 54 provided for the second or right hand set of rudder pedals. However, if a dual control installation is not used, the tie bar 58 and lever arms 57 could be omitted. On the other hand, when present it serves to transmit force from the alternate set of rudder pedals to the primary set to which the rudder cables 49 and 50 are connected.

As was previously mentioned, the rudder pedal hangers are supported pivotally in brackets. Except for the one supporting the pedal hanger 45, these brackets are of standard construction and merely consist of a pair of spaced arms fitted with a cross pin extending through the projecting ends of the bracket arms. In the case of the bracket for the pedal hanger 45, special provision is incorporated therein as part of the automatic disconnect for the rudder pedals to permit two-control type of operation. Before describing this, however, it should be pointed out that the pedal hangers 45 and 46 have an impositive or one-direction connection to the respective levers 47 and 48. Both the hangers and the levers are freely mounted on a cross pin, as on the pin 59 of Figures 4 to 6, with the bifurcated upper end of the hanger straddling the end of the lever. At the same time the pedal hanger has a central step portion 60 between the bifurcations. As in Fig. 6, this extends horizontally just below the edge of lever 47 and it may be seen that if hanger 45 is rotated counterclockwise in this view, the element 60 will contact the lever 45 and impart similar movement thereto. On reverse movement from the position shown the element 60 will move away from the lever 47 (or 48 if the right hand pedal hanger 46 is the one being moved) and no operative contact will occur. In considering this detail in the various figures it should be remembered that while Fig. 2 is a view looking from the side with the forward direction at the left, Figs. 4 and 5 are views looking rearward and Fig. 6 is an opposite side view with the forward direction to the right. Consequently while the direction for free movement of the pedal hanger 45 with respect to the lever 47 is clockwise in Fig. 6, it will be counterclockwise in Fig. 2. This freedom of movement permits folding up or stowing of the rudder pedal and as seen in this last figure it may be swung up by hand in counterclockwise direction to the dotted line position to be retained therein by a spring clip 61. In this position the rudder pedal is out of the way and the actual movement of swinging it to stowed position causes disconnection from the rudder cable system and at the same time causes connection of the cables to the aileron actuating system so that two-control operation of the installation automatically follows.

This automatic conversion depends upon a built-in cam actuated clutch. The cam 63 is built into one side of the support bracket 62 being in the form of a round-boss apertured to carry the pin 59 and having the face directed toward the pedal hanger 45 formed of two main surfaces lying in spaced parallel planes with a sloping portion 64 joining them. Likewise the upper end of the pedal hanger has a sideward extension 65 having its opposed face formed in correspondence with that of boss 63. Extension 65 has one face portion 66, a second parallel portion 67, a sloping cam portion 68 joining the two and also an axially directed connecting surface 69. In boss 63 the corresponding surface is designated 70 and in Fig. 4 it may be seen that an arcuate clearance is provided between faces 69 and 70 to permit movement of the pedal hanger during rudder actuation. These boss or cam elements are held in alignment by pin 59 and are pressed together by a coil spring 71 surrounding the pin 59 and located on the other side of the upper end of pedal hanger 45. The spring thus tends to shift the pedal hanger 45 on the pin 59 as closely as possible to bracket 62. But the cam faces are so orientated with respect to each other that upon rotation of pedal hanger 45 in counterclockwise direction as viewed in Fig. 2, the sloping portions 64 and 68 contact and upon continued movement the pedal hanger is moved away from bracket 62, the relative movement being apparent by comparison of Figs. 4 and 5. With the pedal hanger moved to the stowed position, the portion 60 will no longer contact the lever 47 or 48 as the case may be and so the operative connection to the rudder cables is entirely broken. At the same time the shifting of the hanger 45 to the right as viewed in Figs. 4 and 5 causes a pin 72 projecting from lever 47 to enter an aperture 73 in the enlarged base portion 74 of a lever 75 also carried on the pin 59. This base portion has a cavity 76 concentric to the pin 59 which partially receives the spring 71.

The lever 75 has its otherwise free end pivotally connected as at 78 to a push-pull rod 79 which at its other end connects pivotally to a crank 80 affixed to shaft 29. Finally the end of pin 59 next to lever 75 is supported in bracket element 77. With this hook-up it is evident that all rotational movements of shaft 29 will be transmitted through link 79 to lever 75 and when the pin 72 is in the aperture 73, these movements will be further transmitted to lever 47 and thus to the rudder cables. Thus even though the rudder pedals are disconnected and retracted, rudder actuation may be obtained by rotation of the handwheel 11 although of course, such rudder movement will also be accompanied by aileron movements. By proper design of the elements of the rudder and aileron portions of this interlinked part of the mechanism, different ratios of movement as between the rudder and ailerons can be obtained for a given degree of handwheel rotation.

On the basis of the foregoing description, it should now be evident that conversion of the subject control system from three to two-type control can be readily accomplished by the mere act of swinging up the rudder pedals, particularly the left-hand one 45, to stowed position. Also that the relative positioning of this pedal 45 provides a quickly checked indicator of the state of conversion of the system. Although the illustrative version of the invention shown and described herein is the preferred form, it is apparent that various changes may be made in the system to accomplish the intended result and it is contemplated that all such changes and variations fall within the purview of this invention as defined by the appended claims.

I claim:

1. In a control system for aircraft including a rudder pedal unit movable between operating and stowed positions, a support for pivotally mounting the rudder pedal unit, a rudder control transmission adapted to be actuated by the rudder pedal unit, a second control transmission, means associated with the rudder pedal unit comprising a cam element mounted to be movable with said rudder pedal unit, and coupling elements respectively associated with said first and second control transmissions, one of said coupling elements being in operative engagement with the cam and the cam element thereby being adapted to move the coupling elements into operative connection upon movement of the rudder pedal unit to stowed position.

2. In a control system for aircraft having sets of control surfaces providing different control functions inclusive of steering in yaw and roll, a first control connected to operate the yaw control surface, a second control adapted to undergo rectilinear movement, the said second control being connected to operate the roll control surfaces through a control transmission including a shaft partaking of the rectilinear motion of the second control, a pivotally attached support link extending from said shaft, a second shaft supported by the said link, a third shaft mounted for rotation of fixed structure, a support link pivotally connecting said second and third shafts and force transmission elements interconnecting all of said shafts in series for transmitting the rotary motion of the first shaft to the third regardless of positional variations affecting the first shaft and a releasable coupling operatively connected to the third shaft and adapted to be actuated by movement of the first control to effect interconnection of the yaw and roll controls for conjoint operation.

3. In a control system for aircraft incorporating control surfaces having different control functions inclusive of yaw and roll, a first control, a mount for said control, a yaw control transmission operatively connected to said first control, a second control, a roll control transmission operatively connected to said control, an operating interconnection extending between the yaw and the roll control transmissions including a releasable coupling comprising a pair of levers carried by the said mount and respectively linked to the yaw and roll control transmissions, the said levers being shiftable on the mount into operating interconnection, and cam means incorporated in the mount to be actuated by movement of one of the said controls into camming engagement with the mounting structure to cause shifting of the levers thereon.

4. In a control system for aircraft having sets of control surfaces providing different control functions, a control adapted to independently operate two or more surfaces and having rectilinear movement incident to accomplishment of one of said control functions, separate linkage systems connecting the control to the respective surfaces to be operated thereby, one of said linkage systems being connected to be actuated by the rectilinear movement of the control, a shaft connected to partake of the rectilinear motion of said control and adapted also to be driven in rotation by said control to accomplish another of said control functions, a second shaft, a third shaft mounted for rotation on fixed structure, means carried by said first and third shafts adapted to support said second shaft at fixed distances therefrom, and force transmission elements interconnecting all of said shafts in series for transmitting the rotary motion of the first shaft to the third shaft regardless of positional variations affecting the first shaft.

5. In a convertible control installation for aircraft including a rudder pedal unit movable between operating and stowed positions, a rudder control transmission system extending from operative connection with the rudder pedal to operative connection with the rudder but adapted to be actuated by the rudder pedal only when the pedal is in operating position, a second control system, coupling means having separable coupling portions respectively having operative interconnection with the two control systems, and means connected to the rudder pedal and to one of the coupling portions adapted to shift the coupling portion into operative engagement with the other coupling portion in consequence of movement of the rudder pedal to stowed position whereby such movement will effect connection of the rudder control transmission system to the said second control system.

6. In an aircraft control system, the combination of a pilot operable control member mounted to be moved in opposite directions from a neutral position, a control surface operating linkage, the said operating linkage having a lost-motion operating connection to the control member adapted to be actuated thereby solely when the control member is moved in one of the directions from neutral, the said control member being further adapted to be placed in stowed position when moved in the other of said directions from neutral, a second control operating linkage, a releasable force transmission coupling associated with the said first and second operating linkages, the said coupling being characterized as a normally open type coupling, and means connected to the coupling and to the said control member adapted to engage the coupling upon movement of the control member to stowed position to thereby interconnect the said operating linkages.

7. In a control system for dirigible craft incorporating control members having different control functions inclusive of steering about different axes, a control actuating unit having separate ranges of movement, a control transmission operatively interconnecting the control actuating unit to one of said control members, a second control transmission normally independent of the first and operatively connected to another of said control members, means for establishing an operating interconnection between the two control transmissions including a coupling having coupling elements respectively connected to said first and second control transmissions, and means connected to the control actuating unit on the one hand and to one coupling element on the other to respond to one range of movement of the said unit, the said means being formed to move the coupling elements into operative connection in response to movement of the control actuating unit through the proper range.

References Cited in the file of this patent

UNITED STATES PATENTS

| Number | Name | Date |
| --- | --- | --- |
| 1,802,117 | Leisy | Apr. 21, 1931 |
| 2,442,289 | Garehime | May 25, 1948 |
| 2,579,265 | Lander | Dec. 18, 1951 |